United States Patent [19]
Okada et al.

[11] Patent Number: 5,920,280
[45] Date of Patent: Jul. 6, 1999

[54] FMCW RADAR AND METHOD FOR ESTIMATING DISTANCE AND RELATIVE VELOCITY

[75] Inventors: Tsuyoshi Okada, Yokosuka; Hisashi Kurokawa, Yokohama; Masayuki Hamada, deceased, late of Tokyo; Junji Hamada, legal representative, Nagoya, all of Japan

[73] Assignee: Matsushita Electric Industrial Co., Ltd., Osaka, Japan

[21] Appl. No.: 09/026,940

[22] Filed: Feb. 20, 1998

[30] Foreign Application Priority Data

Feb. 20, 1997 [JP] Japan ..................................... 9-036154

[51] Int. Cl.⁶ ............................. G01S 13/60; G01S 13/93
[52] U.S. Cl. ............................. 342/109; 342/128; 342/70
[58] Field of Search ..................................... 342/109, 112, 342/115, 128, 129, 70

[56] References Cited

U.S. PATENT DOCUMENTS

| | | | |
|---|---|---|---|
| 5,014,063 | 5/1991 | Studenny | 342/130 |
| 5,508,706 | 4/1996 | Tsou et al. | 342/192 |
| 5,563,602 | 10/1996 | Stove | 342/70 |
| 5,677,695 | 10/1997 | Suzuki et al. | 342/109 |

FOREIGN PATENT DOCUMENTS

5-188141  3/1993  Japan .

*Primary Examiner*—John B. Sotomayor
*Attorney, Agent, or Firm*—McDermott,Will & Emery

[57] ABSTRACT

A relative distance and relative velocity to a target object is accurately estimated even if an error in slopes of the triangular wave modulation, that is unbalanced upward and downward slopes, or error in absolute values in an FMCW radar exists. A first distance estimator estimates a distance up to the target object based on a sum of a beat wave frequency generated between the upward and downward slopes of the triangular wave and an absolute value of an average frequency modulation factor which is a mean value of frequency modulation factors for the upward and downward slopes of the triangular wave, and a first velocity estimator estimates a relative velocity to the target object based on a time difference of the calculated distance. A tentative frequency modulation factor estimator estimates an absolute value of a tentative frequency modulation factor based on the calculated distance and velocity, and then estimates a more accurate relative velocity to the target object based on the estimated absolute value of the tentative frequency modulation factor and the distance calculated by the first distance estimator.

14 Claims, 4 Drawing Sheets

FMCW RADAR AND METHOD FOR ESTIMATING DISTANCE AND RELATIVE VELOCITY

FIELD OF THE INVENTION

The present invention relates to the field of FMCW radars(frequency modulated continuous wave radars) which are installed in automobiles and at roadsides and their methods for detecting the relative distance and relative velocity to a target object with the goal, for example, of supporting smooth and safe traffic flow.

BACKGROUND OF THE INVENTION

An FMCW radar and the principle of the prior art are detailed in a range of documents including p. 274ff. of the "Revised Edition Radar Technology" (issued by the Institute for Electronics, Information and Communications Engineers) and "Introduction to Radar Systems" (written by M. I. Skolnik). One improvement in the accuracy of an FMCW radar and its application are also disclosed in Japanese Laid-open Patent No. H5-188141.

Figure 2:
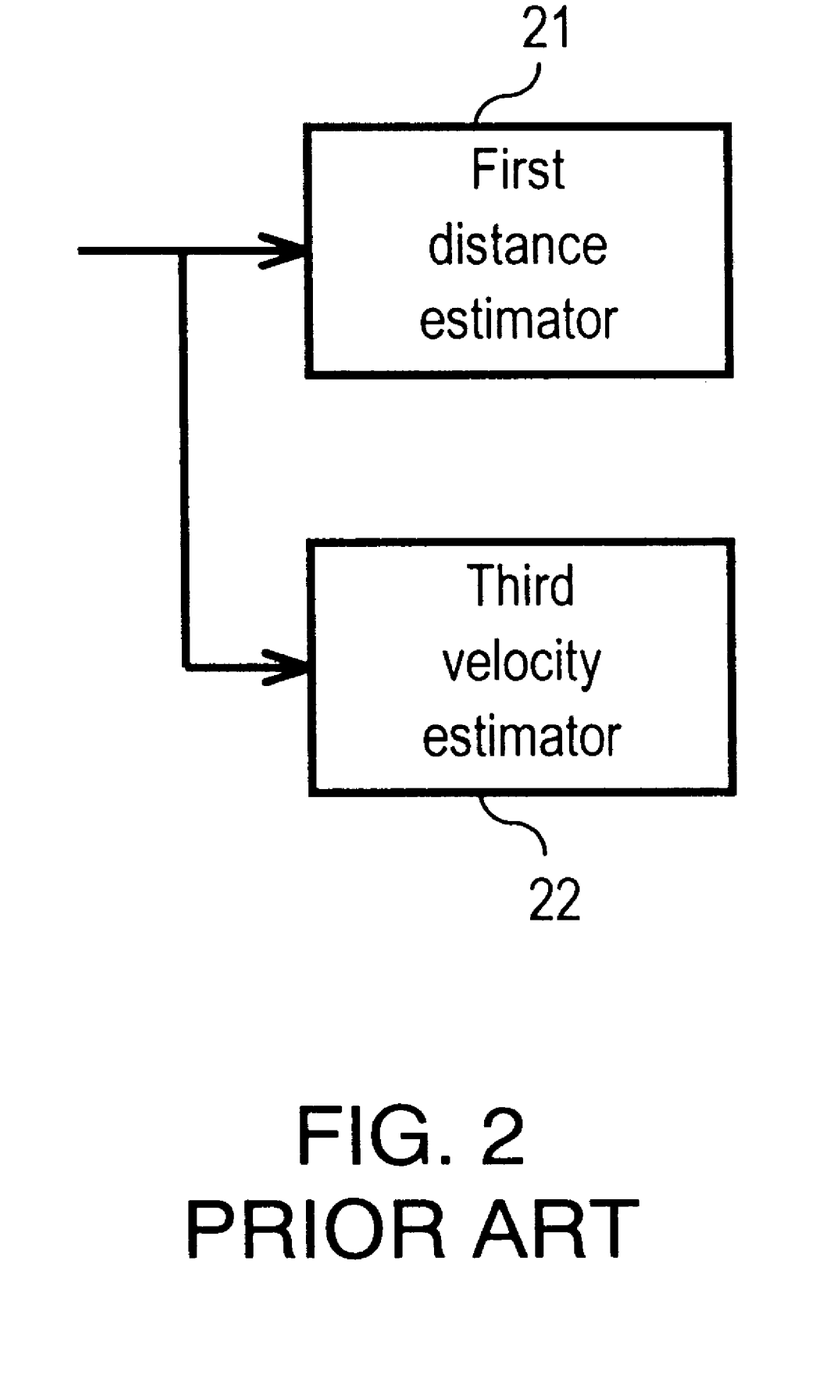
FIG. 2 is a brief block diagram of a first example of an FMCW radar of the prior art.

An FMCW radar of the prior art is explained next with reference to the drawings. FIG. 2 shows an outline of a first example of a FMCW radar of the prior art. In FIG. 2, the reference numeral 21 is a first distance estimator and the reference numeral 22 is a third velocity estimator.

Figure 3:
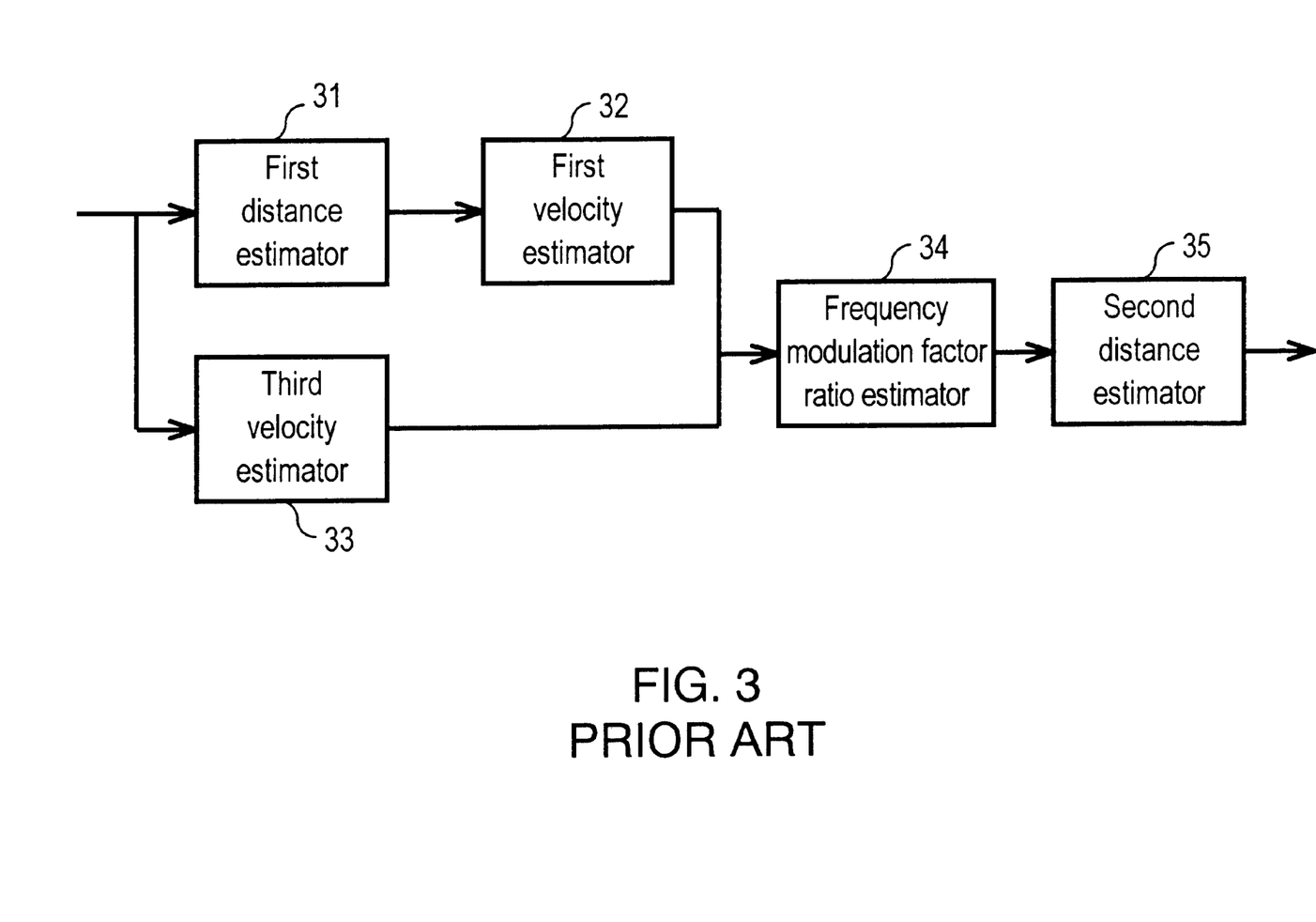
FIG. 3 is a brief block diagram of a second example of the FMCW radar of the prior art.

FIG. 3 shows an outline of a second example of the FMCW radar of the prior art. In FIG. 3, the reference numeral 31 is a first distance estimator, the reference numeral 32 is a first velocity estimator, the reference numeral 33 is a third velocity estimator, the reference numeral 34 is a frequency modulation factor ratio estimator, and the reference 35 is a second distance estimator.

Figure 4A:
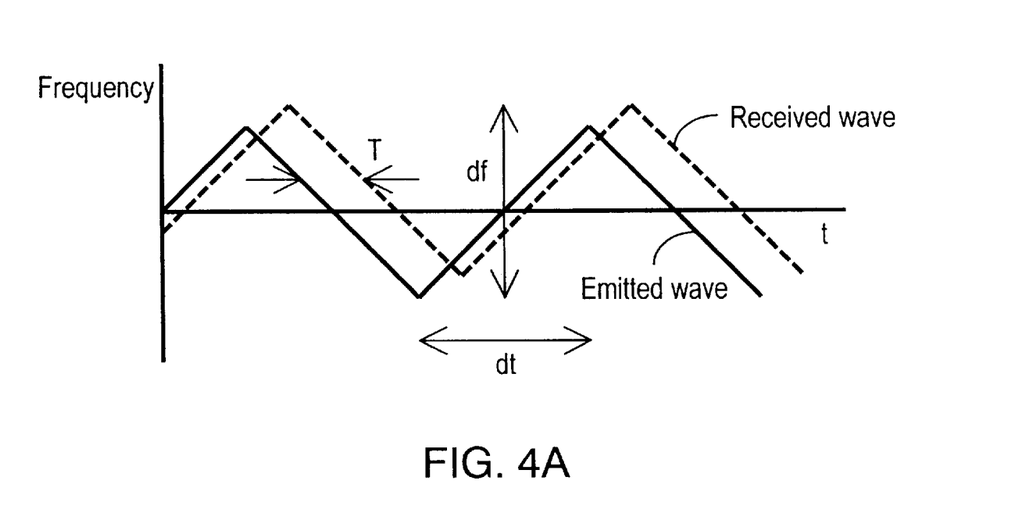
FIG. 4A shows the relation between the frequency of emitted and received radio waves and time for explaining the principle of the FMCW radar.
Figure 4B:
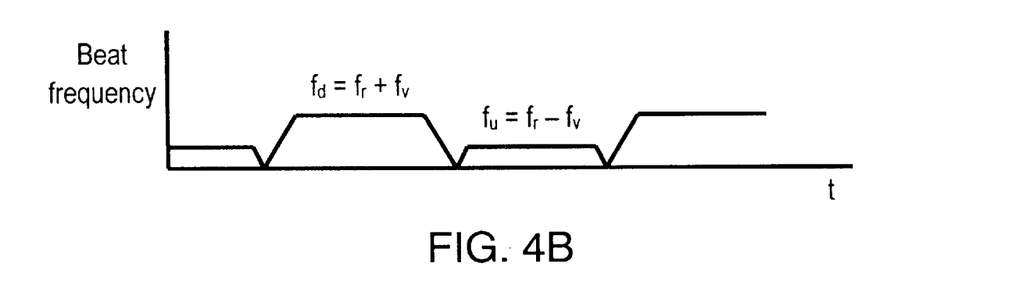
FIG. 4B shows the relation between the beat wave frequency and time for explaining the principle of the FMCW radar.

FIGS. 4A and 4B show the relation between the frequency of radio waves to be transmitted or received and time for explaining the principle of the FMCW radar.

Since the specific circuit configuration for obtaining the beat wave in the FMCW radar is not directly associated with the present invention, its explanation is omitted here. An example and block diagram related to such circuit configuration is described in documents including the abovementioned "Introduction to Radar Systems." The frequency of the beat wave is used in the following explanation. Any suitable method may be selected for obtaining the frequency of the beat wave from a range of methods including filter bank and digital signal processing such as FFT after analog-to-digital conversion.

The principle whereby information the distance and velocity is included in the frequency of the beat wave and the method for calculating position and velocity using the FMCW radar of the prior art are explained with reference to FIGS. 4A and 4B.

A wave transmitted by the radar is reflected by a target object (reflector) at a distance R, and returns to the radar after the elapse of time 2R/c (c is the velocity of light).

The emitted wave is a modulated wave whose frequency is modulated with repetitive triangular waves as shown by the bold line in FIG. 4A. Accordingly, the frequency of the returning wave and emitted wave are not equivalent. More specifically, the frequency of signals transmitted, while the emitted wave travels to and back the distance R, is shifted. The beat wave is generated by combining the receiving signal which receives this reflected wave with the transmitted signal, as a result of the difference in the frequencies of these two signals. The frequency of the beat wave $f_r$ can be defined according to the following Equation (1):

$$f_r = (2R/c) \times a \quad (1)$$

If "a" is the absolute value of the frequency modulation factor which indicates a change in the frequency per unit time, "a" can be defined according to the following Equation (2):

$$a = |df/dt| \quad (2)$$

where "df" is the difference in the frequency modulated vertically using the triangular wave and "dt" is the time spent for sweeping the frequency difference.

When a target object is moving relative to the radar (i.e. when the distance between the radar and target object is changing), the reflected wave causes frequency shifting relative to the incident wave due to the Doppler effect. In other words, the frequency of the reflected wave itself is shifted, and a beat wave is generated which differs from the aforementioned beat wave. The frequency $f_v$ of this beat wave can be defined according to the following Equation (3):

$$f_v = (2V/c) \times f_c \quad (3)$$

where V: relative velocity, and $f_c$: center frequency of the transmitted wave.

Accordingly, a beat wave which is governed by the distance and velocity defined by Equations (1) and (3) is generated by combining the emitted wave modulated by the triangular wave and the receiving wave which receives reflection of the emitted wave.

A beat frequency $f_u$ during the upward slope of the triangular wave, i.e., while the frequency increases with the elapse of time (hereafter referred to as the upward slope period), can be defined according to the following Equation (4). (Refer to FIG. 4B.)

$$f_u = f_r - f_v \quad (4)$$

On the other hand, the beat frequency $f_d$ during the downward slope of the triangular wave, i.e., while the frequency decreases with the elapse of time (hereafter referred to as the downward slope period), can be defined according to the following Equation (5). (Refer to FIG. 4B.)

$$f_d = f_r + f_v \quad (5)$$

In the FMCW radar of the prior art, the frequencies of the beat wave in each upward and downward slope of frequency modulation by the triangular wave are first calculated. Then, equations (1), (3), (4), and (5) are solved using these values for identifying the relative distance R and the relative velocity V between the radar and target object. Specifically, $$R = (f_u + f_d)/4/a \times c \quad (6)$$

$$V = (f_u - f_d)/4/f_c \times c \quad (7)$$

First, the operation of the first example of the FMCW radar of the prior art is explained with reference to FIG. 2. Here, suppose that the absolute value of the modulation factor for the upward slope, the absolute value of the modulation factor for the downward slope, and the absolute value of their mean value which is the average frequency modulation factor are equivalent. The FMCW radar receives respective beat frequencies $f_u$ and $f_d$ during the upward and downward slopes of the frequency modulation from the previous process.

The first distance estimator 21 estimates the relative distance R between the radar and target object in accordance with Equation (6), using the beat frequencies $f_u$ and $f_d$ and an absolute value a of the average frequency modulation factor (the value previously designed or set to the radar based on actual measurement).

The third velocity estimator 22 estimates the relative velocity V between the radar and target object in accordance with Equation (7).

With the above FMCW radar of the prior art and procedures, the distance and velocity are easily identified using the above Equations (6) and (7) based on the beat frequency in the upward and downward slopes of triangular frequency modulation.

Next, the operation of the second example of the FMCW radar of the prior art is explained with reference to FIG. 3. The second example of the FMCW radar of the prior art takes into account the case when an error is included in the absolute value of the frequency modulation factor previously set in the radar. The mean value of absolute values of the frequency modulation factor for the upward and downward slopes is often used as an absolute value of the modulation frequency factor previously set for the radar. Hereafter, this mean value is thus called an absolute value a of the average frequency modulation factor. If the absolute value a is different from an absolute value $a_t$ of the true average frequency modulation factor, the beat frequencies can be defined as follows:

$$f_u=(2R/c) \times a_t-(2V/c) \times f_c \tag{8}$$

$$f_d=(2R/c) \times a_t+(2V/c) \times f_c \tag{9}$$

Here, the first distance estimator 31 calculates the distance using Equation (6). The absolute value a of the frequency modulation factor used in this calculation is a value previously set for the radar. Therefore, the distance $R_1$ calculated is not the true value. The ratio $a/a_t$ of the absolute value a of the frequency modulation factor previously set for the radar to the absolute value at of the true frequency modulation factor is called an average frequency modulation factor ratio p. The estimated distance $R_1$ calculated using Equation (10) is therefore a value multiplying the true distance R by 1/Average frequency modulation factor ratio p.

$$R_1=R \times a_t/a=R/p \tag{10}$$

where $P=a/a_t$, R: true distance.

The first velocity estimator 32 calculates a velocity $V_1$ from the time difference using the distance calculated by the first distance estimator 31. The velocity $V_1$ and the true velocity V can be defined according to the following Equation (11):

$$V_1=V/p \tag{11}$$

where V: true velocity.

Next, the third velocity estimator 33 calculates the velocity using Equations (8) and (9) as simultaneous equations. The velocity identified using these two equations is the genuine velocity V which is not affected by the absolute value a of the average frequency modulation factor.

Accordingly, the frequency modulation factor ratio estimator 34 calculates the average frequency modulation factor ratio p from the true velocity V calculated by the third velocity estimator 33 and the velocity $V_1$ calculated by the first velocity estimator 32. Using this p, i.e. by multiplying $R_1$ by p, the second distance estimator 35 estimates the true R.

With the above configuration, distances and velocities close to their true values may be estimated even if an error exists in the absolute value of the average frequency modulation factor.

However, the FMCW radar with the configuration detailed in the first example may cause an error in the calculated distance and velocity if there is a difference between the actual value and the value previously set for calculating the distance and velocity related to the slope of the average frequency modulation by the triangular wave, i.e., the absolute value of the average frequency modulation factor which is a change in the frequency per unit time.

The FMCW radar with the configuration as detailed in the second example can handle an error in the absolute values of the frequency modulation factor for upward and downward slopes. However, in this radar of the prior art, the absolute values of the frequency modulation factor for the upward slope and downward slopes are supposed to be completely equal as a precondition. If this precondition is not observed, the radar generates a large error in velocity, and the distance may be corrected using the velocity with this large error. Consequently, the aforementioned correction may instead have a detrimental effect.

For example, if the average frequency modulation factor ratio of the previously set absolute value a of the average frequency modulation factor for the upward and downward slopes of the triangular wave to the absolute value au of the true frequency modulation factor for the upward and downward slopes of the triangular wave is other than 1, the distance may deviate by an amount equivalent to the modulation factor ratio. If there is a difference in value between the upward and downward slopes, an error in velocity may be generated in proportion to this difference.

SUMMARY OF THE INVENTION

The present invention offers an FMCW radar capable of accurately identifying the relative distance and relative velocity up to a target object even if an error exists in the frequency modulation slopes of the triangular wave, i.e., unbalanced upward and downward slopes, or in the absolute value.

The FMCW radar of the present invention comprises a first distance estimator, a first velocity estimator, a tentative frequency modulation factor estimator, a second velocity estimator, an average frequency modulation factor ratio estimator, and a second distance estimator. The first distance estimator estimates a distance $R_1$ up to a target object based on the sum of the beat wave frequency generated during the upward and downward slopes of the above triangular wave and an absolute value a of the average frequency modulation factor which is a mean value of the absolute values of the presumed frequency modulation factors (change in the frequency per unit time) for the upward and downward slopes of the triangular wave. The first velocity estimator estimates a velocity $V_1$ relative to the target object based on the time difference in the distance identified by the first distance estimator. The tentative frequency modulation factor estimator estimates the product $b_u$ ($=p \times a_u$) of the average frequency modulation factor ratio multiplied by the absolute value of the true frequency modulation factor for the upward slope and the product $b_d$ ($=p \times a_d$) of the average frequency modulation factor ratio multiplied by the absolute value of the true frequency modulation factor for the downward slope based on the distance calculated by the first distance estimator and the velocity calculated by the first velocity estimator; where p is the average frequency modulation factor ratio $2a/(a_u+a_d)$ which is the ratio of the absolute value a of the presumed average frequency modulation factor to the mean value of the absolute values $a_u$ and $a_d$ of respective frequency modulation factor for each upward and downward slope of the true triangular wave. The second velocity estimator calculates a more accurate velocity $V_2$ relative to the target object based on the absolute values $b_u$ and $b_d$ of the tentative frequency modulation factors and the distance identified by the first distance estimator. The average frequency modulation factor ratio estimator estimates the ratio p of the absolute value a of the aforementioned presumed average frequency modulation factor to the mean value of the absolute values $a_u$ and $a_d$ of respective frequency modulation factor for each upward and downward slope of the true triangular wave, based on the velocity $V_2$ calculated by the second velocity estimator and the velocity $V_1$ calculated by the first velocity estimator. The second distance estimator calculates a more accurate distance R2 using the distance $R_1$ calculated by the first distance estimator and the average frequency modulation factor ratio p' calculated by the average frequency modulation factor ratio estimator.

The present invention thus enables the accurate estimation of distance and relative velocity even if an error exists in the slopes of the triangular wave modulation.

DESCRIPTION OF THE PREFERRED EMBODIMENT

The present invention first estimates a product $b_u$ of an average frequency modulation factor ratio multiplied by a frequency modulation factor for the upward slope and a product $b_d$ of the average frequency modulation factor ratio multiplied by a frequency modulation factor for the downward slope based on a distance calculated using the equation and velocity identified from a time difference of the calculated distance. Next, velocity after correcting effect of an error in the frequency modulation factor based on the $b_u$ and $b_d$ is estimated. An average frequency modulation factor ratio is calculated from a ratio of the corrected velocity to the velocity first identified from the time difference of the distance. Finally, a distance after correcting an effect of an error in the frequency modulation factor is estimated.

An exemplary embodiment of the present invention is explained in details next with reference to drawings.

Figure 1:
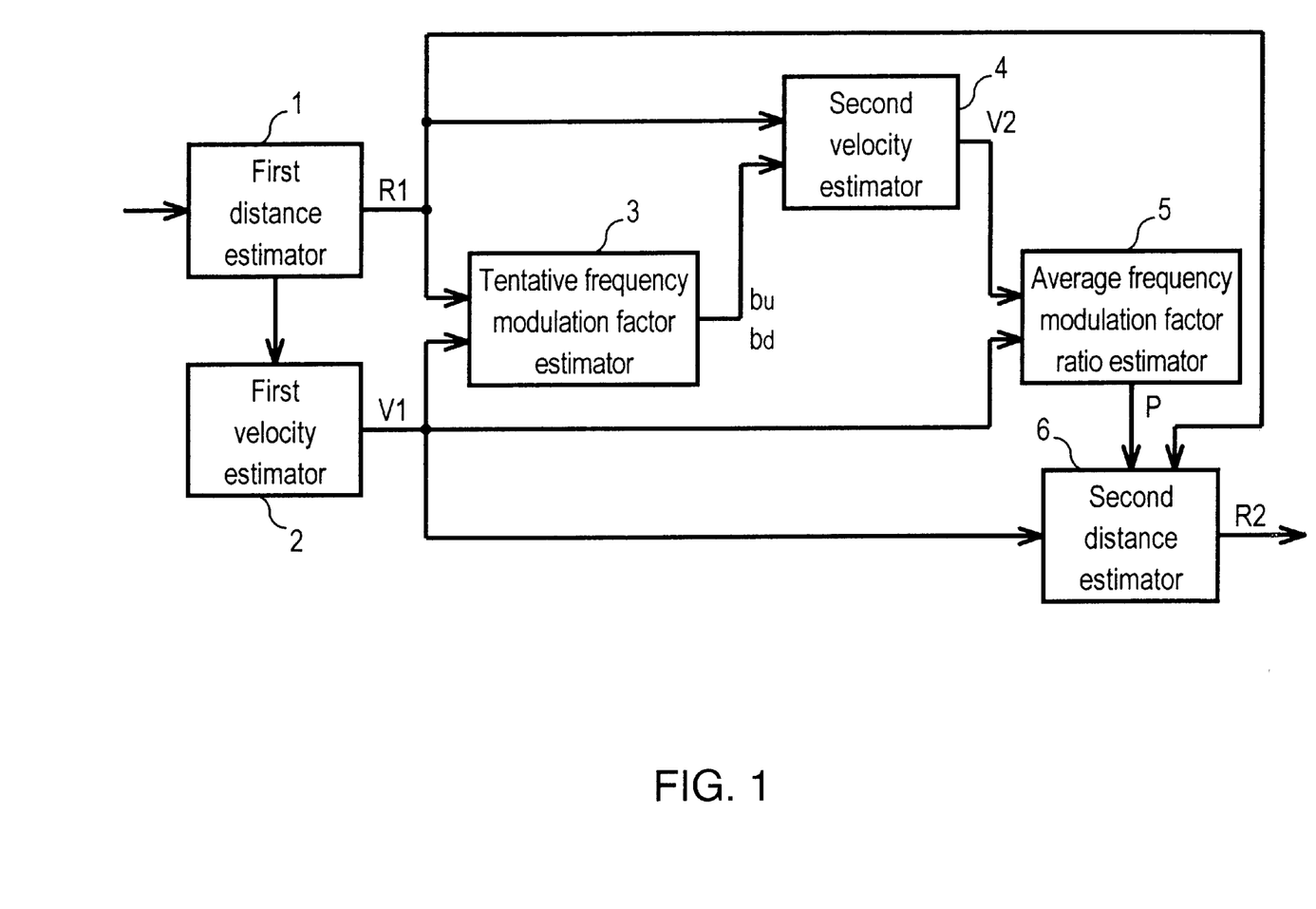
FIG. 1 is a brief block diagram of an FMCW radar in accordance with an exemplary embodiment of the present invention.

FIG. 1 shows a block diagram of an FMCW radar in the exemplary embodiment of the present invention. In FIG. 1, the FMCW radar comprises a first distance estimator 1, a first velocity estimator 2, a tentative frequency modulation factor estimator 3, a second velocity estimator 4, an average frequency modulation factor ratio estimator 5, and a second distance estimator 6.

The operation of the FMCW radar as configured above is explained next. For simplification, an absolute value of a true modulation factor for the upward slope and an absolute value of a true modulation factor for the downward slope are considered equivalent, and a mean value of these absolute values are considered equal to a mean absolute value a of a preset frequency modulation factor in the prior art. In this exemplary embodiment, however, absolute values of true modulation factors for the upward and downward slopes are different, and they are respectively called values $a_u$ and $a_d$.

A beat wave frequency $f_u$ generated during the upward slope and a beat wave frequency $f_d$ generated during the downward slope can be defined according to the following Equations (12) and (13):

$$f_u = 2R/c \times a_u - 2V/c \times f_c \quad (12)$$

$$f_d = 2R/c \times a_u - 2V/c \times f_c \quad (13)$$

The first distance estimator 1 estimates a relative distance up to a target object according to the following Equation (14) using an absolute value a of an average frequency modulation factor preset for the radar:

$$R_1 = (f_d + f_u)/4/a \times c \quad (14)$$

where $R_1$: An estimated distance identified by the first distance estimator.

If the equations (12) and (13) are fitted to Equation (14), the above $R_1$ can be defined:

$$R_1 = (a_u + a_d)/2/a \times R = R/p \quad (15)$$

=R/P where $1/p = (a_u + a_d)/2/a$.

The "p" is a ratio of the absolute value a of the preset average frequency modulation factor to an average of the absolute values $a_u$ and $a_d$ of the true frequency modulation factors for the upward and downward slopes of the triangular wave. $R_1$ is a true distance R multiplied by 1/p, generating a difference for that amount with the true distance R.

Next, the first velocity estimator 2 estimates a relative velocity $V_1$ between the radar and target object based on the time difference of the distance identified by the first distance estimator 1.

For example, a velocity $V_1$ (k) in a discrete time k of $V_1$ may be calculated by the following Equation (16) using values $R_1(k)$ and $R_1(k-1)$ of $R_1$ obtained during the time k and k−1:

$$V_1(k) = -(R_1(k) - R_1(k-1))/t_0 \quad (16)$$

where $V_1$: A moving speed toward shorter distance is considered a positive direction, and $t_0$: Sampling Period.

The above $V_1$ can be defined according to the following Equation (17) since it is a value obtained from the time difference of the above measured distance $R_1$:

$$V_1 \approx V/p \quad (17)$$

Thus, the true velocity V multiplied by 1/p is obtained.

Next, suppose that the velocity is estimated by the third velocity estimator in the first example of the prior art using Equation (18). If the velocity is Ve, $$V_e = (f_d - f_u)/4/f_c \times c \quad (18)$$

If Equations (12) and (13) are fitted to Equation (18):

$$V_e = V + R/(2 \times f_c) \times (a_d - a_u) \quad (19)$$

because absolute values of the true frequency modulation factors for the upward and downward slopes are not equal. An error Ev in proportion to the difference between R and the true modulation factors for the upward and downward slopes against the true velocity V may be generated.

$$E_v = R/(2 \times f_c) \times (a_d - a_u) \tag{20}$$

For example, if $a_d = 3 \times 10^{11}$ (Hz/sec), $a_u = 2.7 \times 10^{11}$ (Hz/sec) (i.e. 10% of unbalanced error), $f_c = 76.5$ GHz, and R=10 m are used in Equation (15), an error of 1.96 [m/s] (=7 Km/h) may be generated regardless of a value of the true velocity. Accordingly, extremely large error may be caused if the velocity is estimated directly using Equation (18) as it is. The present invention thus calculates the relative velocity $V_1$ first using Equation (17) by the first velocity estimator 2.

Next, the $a_u$ and $a_d$ are solved using Equations (12) and (13) respectively. If $R_1$ calculated by the first distance estimator 1 and $V_1$ calculated by the first speed estimator 2 are used for the distance and velocity, $b_{dtmp}$ and $b_{utmp}$ which represent values for $a_u$ and $a_d$ can be defined according to the following Equations (21) and (22):

$$b_{utmp} = c/R_1/2 \times (f_{bu} + 2 \times V_1/c \times f_c) \tag{21}$$

$$b_{dtmp} = c/R_1/2 \times (f_{bd} - 2 \times V_1/c \times f_c) \tag{22}$$

where $f_{bu}$ and $f_{bd}$ are beat wave frequencies generated during the upward and downward slopes of the triangular wave.

If Equations (15) and (17) are fitted to the above Equations, they will be the following Equations (23) and (24):

$$b_{utmp} = p \times a_u + (1-p) V_1/R_1 \times f_c \tag{23}$$

$$b_{dtmp} = p \times a_d - (1-p) V_1/R_1 \times f_c \tag{24}$$

If a major objective of an automobile installed with this FMCW radar is, for example, to track a front car, that is auto cruise, the relative velocity $V_1$ may often varies near 0. In other words, a mean value $M(V_1)$ of the velocity exceeding a specific time can be defined according to the following Equation (25):

$$M(V_1) \approx 0 \tag{25}$$

Accordingly, a mean value $M(b_{utmp})$ of the $b_{utmp}$ and a mean value $M(b_{dtmp})$ of the $b_{dtmp}$ exceeding a specific time can be defined according to the following Equations (26) and (27). It is apparent that the $b_{utmp}$ and $b_{dtmp}$ are equivalent to $p \times a_u$ and $p \times a_d$.

$$M(b_{utmp}) = p \times a_u \tag{26}$$

$$M(b_{dtmp}) = p \times a_{du} \tag{27}$$

The tentative frequency modulation factor estimator 3, based on the above concept, calculates the products $b_u$ (=$p \times a_u$) and $b_d$ (=$p \times a_d$) of the average frequency modulation factor ratio multiplied by respective absolute value of the true frequency modulation factor for the upward and downward slopes of the triangular wave by sampling $b_{utmp}$ and $b_{dtmp}$, for example, for a long time and calculating their mean values. If the absolute value of the modulation factor of the FMCW radar is according to the design, that is $$a_u = a_d = a \tag{28},$$

the products $b_u$ and $b_d$ will be:

$$b_u = a_u, \, b_d = a_d \tag{29}.$$

Thus, $b_u$ and $b_d$ are provisionally called tentative frequency modulation factors.

Next, a value for the following Equation is examined:

$$E_{est} = R_1/(2 \times f_c) \times (b_d - b_u) \tag{30}.$$

If $b_u$, $b_d$, and $R_1$ of Equation (15) are fitted to the above Equation and compared with Equation (20), $$E_{est} = E_v \tag{31}.$$

In other words, a velocity error Ev included in Ve of Equation (16) may be estimated by calculating E est acceding to Equation (26).

The second velocity estimator 4 estimates, based on the above concept, an error included in Ve based on the tentative frequency modulation factors $b_u$ and $b_d$ calculated by the tentative frequency modulation factor estimator 3 and the distance $R_1$ calculated by the first distance estimator 1, and then estimates more accurate velocity $V_2$ by correcting the estimated error. The second velocity estimator 4 may also be able to estimate $V_2$ by solving simultaneous equations for velocity using $b_u$ and $b_d$ instead of $a_u$ and $a_d$ in Equations (12) and (13).

The average frequency modulation factor ratio estimator 5 then compares the velocity $V_2$ calculated by the second velocity estimator 4 and the velocity $V_1$ calculated by the first velocity estimator 2 defined by Equation (17) for calculating a corrected average frequency modulation factor ratio p' according to:

$$V_2/V_1 = p' \tag{32}.$$

Once p' is obtained, the second distance estimator 6 finds a more accurate estimated distance R2 using $R_1$ defined by Equation (15):

$$R_2 = p' \times R_1 \tag{33}.$$

With the above configuration, a relative distance and relative velocity up to the target object may be identified with higher accuracy even if absolute values of true modulation factors for the upward and downward slopes $a_u$ and $a_d$ differ from each other.

The tentative frequency modulation factor estimator 3 also enables to estimate a tentative frequency modulation factor with extremely small calculation load and memory for updating the above $b_u$ in each discrete time by sequentially updating $b_u$ using $b_{utmp}$ and $b_{dtmp}$ obtained from Equations (23) and (24) according to the following Equations:

$$b_u(k) = b_u(k-1) + g_1 \times (b_{utmp} - b_u(k-1)) \tag{34a}$$

$$b_d(k) = b_d(k-1) + g_1 \times (b_{dtmp} - b_d(k-1)) \tag{34b}$$

where k is discrete time and $g_1$ and $g_2$: Preset gain.

This offers the tentative frequency modulation factor estimator 3 which enables to estimate $b_u$ and $b_d$ nearly at real time even the velocity is not 0.

The tentative frequency modulation factor estimator 3 may also estimate $b_u$ and $b_d$ accurately, even if a mean value of $V_1$ in a long duration of time is not 0, without overlaying an error to $b_u$ and $b_d$ due to the velocity $V_1$ as shown in Equations (23) and (24) by limiting estimation only when the velocity $V_1$ is nearly 0. Specifically, since the velocity $V_1$ can nearly be considered 0, $b_{utmp}$ and $b_{dtmp}$ can be defined according to the following Equations:

$$b_{utmp} = c/R_1/2 \times f_u \tag{35a}$$

$$b_{dtmp} = c/R_1/2 \times f_d \tag{35b}$$

where c: Optical velocity $f_u$, $f_d$: beat wave frequency generated respectively in the upward and downward slopes of the triangular wave modulation, and $b_u$ and $b_d$ can be accurately estimated by filtering $b_u$ and $b_d$ from $b_{utmp}$ and $b_{dtmp}$.

Furthermore, the average frequency modulation factor ratio estimator 3 offers an average frequency modulation factor ratio estimating unit which may require a small calculation load and memory for just sequentially updating the average frequency modulation factor ratio in each discrete time according to the following Equation (36):

$$p'(k)=p'(k-1)+k_g \times V_1(k) \times (V_2(k)-p'(k-1) \times V_1(k)) \qquad (36)$$

where, $k_g$: Preset gain.

As explained above, a relative distance and relative velocity up to a target object may be accurately estimated by canceling an error caused by a difference in absolute values of the true modulation factors $a_u$ and $a_d$ and the preset average modulation factor a even the values $a_u$ and $a_d$ in the upward and downward slopes of the frequency modulation in the triangular wave differ from each other.

With the above configuration, an accurate tentative frequency modulation factor estimator 3 and average frequency modulation factor ratio estimator 5 can be realized with less calculation load and memory.

What is claimed is:

1. A FMCW radar for detecting a distance to and relative velocity of a target object based on a beat wave generated between an emitted wave whose frequency is modulated linearly by repetitive triangular waves and a receiving wave which is the emitted wave reflected by the target object, said FMCW radar comprising:

a first distance estimation means for estimating a first distance to the target object using:

a sum of each beat wave frequency generated during upward and downward slopes of said triangular wave, and a preset absolute value of an average frequency modulation factor which is a mean value of absolute values of frequency modulation factors for the upward and downward slopes of said triangular wave;

a first velocity estimation means for estimating a first relative velocity of the target object using a time difference of the first distance;

a tentative frequency modulation factor estimation means for estimating tentative frequency modulation factors by a product of an average frequency modulation factor ratio multiplied by an absolute value of a true frequency modulation factor for the upward slope of the triangular wave and a product of the average frequency modulation factor ratio multiplied by an absolute value of a true frequency modulation factor for the downward slope of the triangular wave using:

the average frequency modulation factor ratio which is a ratio of the absolute value of said average frequency modulation factor to a mean value of absolute values of each frequency modulation factor for the upward and downward slopes of a true triangular wave, the first distance, and the first relative velocity;

a second velocity estimation means for identifying a second relative velocity by the target object using:

the absolute values of said tentative frequency modulation factors and the first distance;

an average frequency modulation factor ratio estimation means for estimating a corrected average frequency modulation factor ratio using:

the second relative velocity and the first relative velocity; and a second distance estimation means for identifying a second distance using:

the first distance and the corrected average frequency modulation factor ratio.

2. The FMCW radar of claim 1, wherein said corrected average frequency modulation factor ratio is estimated by a ratio of said average frequency modulation factor to a mean value of absolute values of the frequency modulation factors for the upward and downward slopes of the true triangular wave.

3. A method for estimating a distance to and relative velocity of a target object based on a beat wave generated between an emitted wave whose frequency is modulated linearly by repetitive triangular waves and a receiving wave which is the emitted wave reflected by the target object, said method comprising steps of:

a first distance estimation for estimating a first distance to the target object using:

a sum of each beat wave frequency generated during upward and downward slopes of said triangular wave, and a preset absolute value of an average frequency modulation factor which is a mean value of absolute values of frequency modulation factors for the upward and downward slopes of said triangular wave;

a first velocity estimation for estimating a first relative velocity of the target object using a time difference of the first distance;

a tentative frequency modulation factor estimation for estimating tentative frequency modulation factors by a product of an average frequency modulation factor ratio multiplied by an absolute value of a true frequency modulation factor for the upward slope of the triangular wave and a product of the average frequency modulation factor ratio multiplied by an absolute value of a true frequency modulation factor for the downward slope of the triangular wave using:

the average frequency modulation factor ratio which is a ratio of the absolute value of said average frequency modulation factor to a mean value of absolute values of each frequency modulation factor for the upward and downward slopes of the true triangular wave, the first distance, and the first relative velocity;

a second velocity estimation for identifying a second relative velocity of the target object using:

the absolute values of said tentative frequency modulation factors and the first distance;

an average frequency modulation factor ratio estimation for estimating a corrected average frequency modulation factor ratio using:

the second relative velocity and the first relative velocity; and a second distance estimation for identifying a second distance using:

the first distance and the corrected average frequency modulation factor ratio.

4. The method of estimating a distance to and relative velocity of a target object according to claim 3, wherein said corrected average frequency modulation factor ratio is estimated by a ratio of said average frequency modulation factor to a mean value of absolute values of the frequency modulation factors for the upward and downward slopes of the true triangular wave.

5. A FMCW radar for detecting a distance to and relative velocity of a target object based on a beat wave generated between an emitted wave whose frequency is modulated linearly by repetitive triangular waves and a receiving wave which is the emitted wave reflected by the target object, said FMCW radar comprising:

a first distance estimation means for estimating a distance to the target object using:
   a sum of each beat wave frequency generated during upward and downward slopes of said triangular waves, and
   a preset absolute value of an average frequency modulation factor which is a mean value of absolute values of frequency modulation factors for the upward and downward slopes of said triangular wave;

a first velocity estimation means for estimating a relative velocity $V_1$ of the target object using a time difference of a distance $R_1$ calculated by said first distance estimation means;

a tentative frequency modulation factor estimation means for estimating tentative frequency modulation factors by a product $b_u$ of an average frequency modulation factor ratio p multiplied by an absolute value $a_u$ of a true frequency modulation factor for the upward slope of the triangular wave and a product $b_d$ of the average frequency modulation factor ratio p multiplied by an absolute value $a_d$ of a true frequency modulation factor for the downward slope of the triangular wave using:
   the average frequency modulation factor ratio p which is $2a/(a_u+a_d)$, a ratio of the absolute value a of said average frequency modulation factor to a mean value of absolute values $a_u$ and $a_d$ of each true frequency modulation factor for the upward and downward slopes of the true triangular wave,
   the distance $R_1$, and
   the relative velocity $V_1$;

a second velocity estimation means for identifying a relative velocity $V_2$ by the target object using:
   the absolute values $b_u$ and $b_d$ of said tentative frequency modulation factors and
   the distance $R_1$;

an average frequency modulation factor ratio estimation means for estimating a corrected average frequency modulation factor ratio p' using:
   the relative velocity $V_2$ and
   the relative velocity $V_1$; and a second distance estimation means for identifying a distance $R_2$ using:
   the distance $R_1$, and
   the corrected average frequency modulation factor ratio p'.

6. An FMCW radar as defined in claim 3, wherein said tentative frequency modulation factor estimation means calculates $b_{utmp}$ and $b_{dtmp}$ using the distance $R_1$ calculated by the first distance estimation means and the relative velocity $V_1$ calculated by the first velocity estimation means, according to the following Equations (1) and (2):

$$b_{utmp}=c/R_1/2\times(f_u+2\times V_1/c\times f_c) \quad (1)$$

$$b_{dtmp}=c/R_1/2\times(f_d+2\times V_1/c\times f_c) \quad (2)$$

for estimating said tentative frequency modulation factors $b_u$ and $b_d$ based on one of a mean value of the above $b_{utmp}$ and $b_{dtmp}$ in a long duration of time and a low-pass filtering result.

7. A FMCW radar as defined in claim 5, wherein said tentative frequency modulation factor estimation means calculates $b_{utmp}$ and $b_{dtmp}$ using the distance $R_1$ calculated by said first distance estimation means, according to the following Equations (3) and (4), only when an absolute value of the relative velocity $V_1$ calculated by said first velocity estimation means is one of below a specified value and zero, and also the relative velocity can be considered nearly zero:

$$b_{utmp}=c/R_1/2\times f_u \quad (3)$$

$$b_{dtmp}=c/R_1/2\times f_d \quad (4)$$

for estimating the absolute values $b_u$ and $b_d$ of said tentative frequency modulation factors based on one of a mean value of the above $b_{utmp}$ and $b_{dtmp}$ in a long duration of time and a low-pass filtering result.

8. An FMCW radar as defined in claim 5, wherein said average frequency modulation factor ratio estimation means sequentially updates said corrected frequency modulation factor ratio p' using the relative velocity $V_2$ calculated by said second velocity estimation means and the relative velocity $V_1$ calculated by said first velocity estimation means according to the following Equation (5):

$$p'(k)=p'(k-1)+k_g\times V_1(k)\times(V_2(k)-p'(k-1)\times V_1(k)) \quad (5).$$

9. The FMCW radar of claim 5, wherein said corrected average frequency modulation factor ratio p' is estimated by a ratio of the absolute value a of said average frequency modulation factor to a mean value of absolute values $a_u$ and $a_d$ of the true frequency modulation factors for the upward and downward slopes of the true triangular wave.

10. A method for estimating a distance to and relative velocity of a target object based on a beat wave generated between an emitted wave whose frequency is modulated linearly by repetitive triangular waves and a receiving wave which is the emitted wave reflected by the target object, said method comprising steps of:

a first distance estimation for estimating a distance to the target object using:
   a sum of each beat wave frequency generated during upward and downward slopes of said triangular wave, and
   a preset absolute value of an average frequency modulation factor which is a mean value of absolute values of frequency modulation factors for the upward and downward slopes of said triangular wave;

a first velocity estimation for estimating a first relative velocity $V_1$ of the target object using a time difference of a distance $R_1$;

a tentative frequency modulation factor estimation for estimating tentative frequency modulation factors by a product $b_u$ of an average frequency modulation factor ratio p multiplied by an absolute value $a_u$ of a true frequency modulation factor for the upward slope of the triangular wave and a product $b_d$ of the average frequency modulation factor ratio p multiplied by an absolute value $a_d$ of a true frequency modulation factor for the downward slope of the triangular wave using:

the average frequency modulation factor ratio p which is $2a/(a_u+a_d)$, a ratio of the absolute value a of said average frequency modulation factor to a mean value of absolute values $a_u$ and $a_d$ of each true frequency modulation factor for the upward and downward slopes of the true triangular wave, the distance $R_1$, and the relative velocity $V_1$;

a second velocity estimation for identifying a relative velocity $V_2$ of the target object using:

the absolute values $b_u$ and $b_d$ of said tentative frequency modulation factors and the distance $R_1$;

an average frequency modulation factor ratio estimation for estimating a corrected average frequency modulation factor ratio p' using:

the relative velocity $V_2$ and the relative velocity $V_1$; and a second distance estimation for identifying a distance $R_2$ using:

the distance $R_1$ and the corrected average frequency modulation factor ratio p'.

11. A method for estimating a distance and relative velocity as defined in claim 10, wherein $b_{utmp}$ and $b_{dtmp}$ are calculated in said tentative frequency modulation factor estimation step using the distance $R_1$ calculated in the first distance estimation step and the relative velocity $V_1$ calculated in the first velocity estimation step, according to the following Equations (1) and (2):

$$b_{utmp}=c/R_1/2\times(f_u+2\times V_1/c\times f_c) \quad (1)$$

$$b_{dtmp}=c/R_1/2\times(f_d+2\times V_1/c\times f_c) \quad (2)$$

for estimating said tentative frequency modulation factors $b_u$ and $b_d$ based on one of a mean value of the above $b_{utmp}$ and $b_{dtmp}$ in a long duration of time and a low-pass -filtering result.

12. A method for estimating a distance and relative velocity as defined in claim 10, wherein $b_{utmp}$ and $b_{dtmp}$ are calculated in said tentative frequency modulation factor estimation step using the distance $R_1$ calculated in said first distance estimation step, according to the following Equations (3) and (4), only when an absolute value of the relative velocity $V_1$ calculated by said first velocity estimation step is one of below a specified value and zero, and also the relative velocity can be considered nearly zero:

$$b_{utmp}=c/R_1/2\times f_u \quad (3)$$

$$b_{dtmp}=c/R_1/2\times f_d \quad (4)$$

for estimating the absolute values $b_u$ and $b_d$ of said tentative frequency modulation factors based on one of a mean value of the above $b_{utmp}$ and $b_{dtmp}$ in a long duration of time and a low-pass filtering result.

13. A method for estimating a distance and relative velocity as defined in claim 10, wherein said corrected frequency modulation factor ratio p' is sequentially updated in said average frequency modulation factor ratio estimation step using the relative velocity $V_2$ calculated in said second velocity estimation step and the relative velocity $V_1$ calculated in said first velocity estimation step according to the following Equation (5):

$$p'(k)=p'(k-1)+k_g\times V_1(k)\times(V_2(k)-p'(k-1)\times V_1(k)) \quad (5).$$

14. The method of estimating a distance to and relative velocity of a target object according to claim 10, wherein said corrected average frequency modulation factor ratio p' is estimated by a ratio of the absolute value a of said average frequency modulation factor to a mean value of absolute values $a_u$ and $a_d$ of the true frequency modulation factors for the upward and downward slopes of the true triangular wave.

* * * * *

UNITED STATES PATENT AND TRADEMARK OFFICE
CERTIFICATE OF CORRECTION

PATENT NO. : 5,920,280
DATED : July 6, 1999
INVENTOR(S) : Okada et al.

It is certified that error appears in the above-identified patent and that said Letters Patent is hereby corrected as shown below:

In the claims:

Claim 5, line 16, change "waves," to --wave--.

Claim 6, line 67, change "$b_{dtmp}=c/R_1/2x(f_d+2xV_1/cxf_c)$" to -- $b_{dtmp}=c/R_1/2x(f_d-2xV_1/cxf_c)$--.

Claim 11, line 34, change " $b_{dmp}=c/R_1/2x(f_d+2xV_1/cxf_c)$" to --$b_{dtmp}=c/R_1/2x(f_d-2xV_1/cxf_c)$--

Signed and Sealed this

Sixteenth Day of May, 2000

Attest:

Q. TODD DICKINSON

*Attesting Officer*     *Director of Patents and Trademarks*